Sept. 10, 1957
G. J. SHOMPHE
2,805,577
GYROSCOPE
Filed Nov. 19, 1953
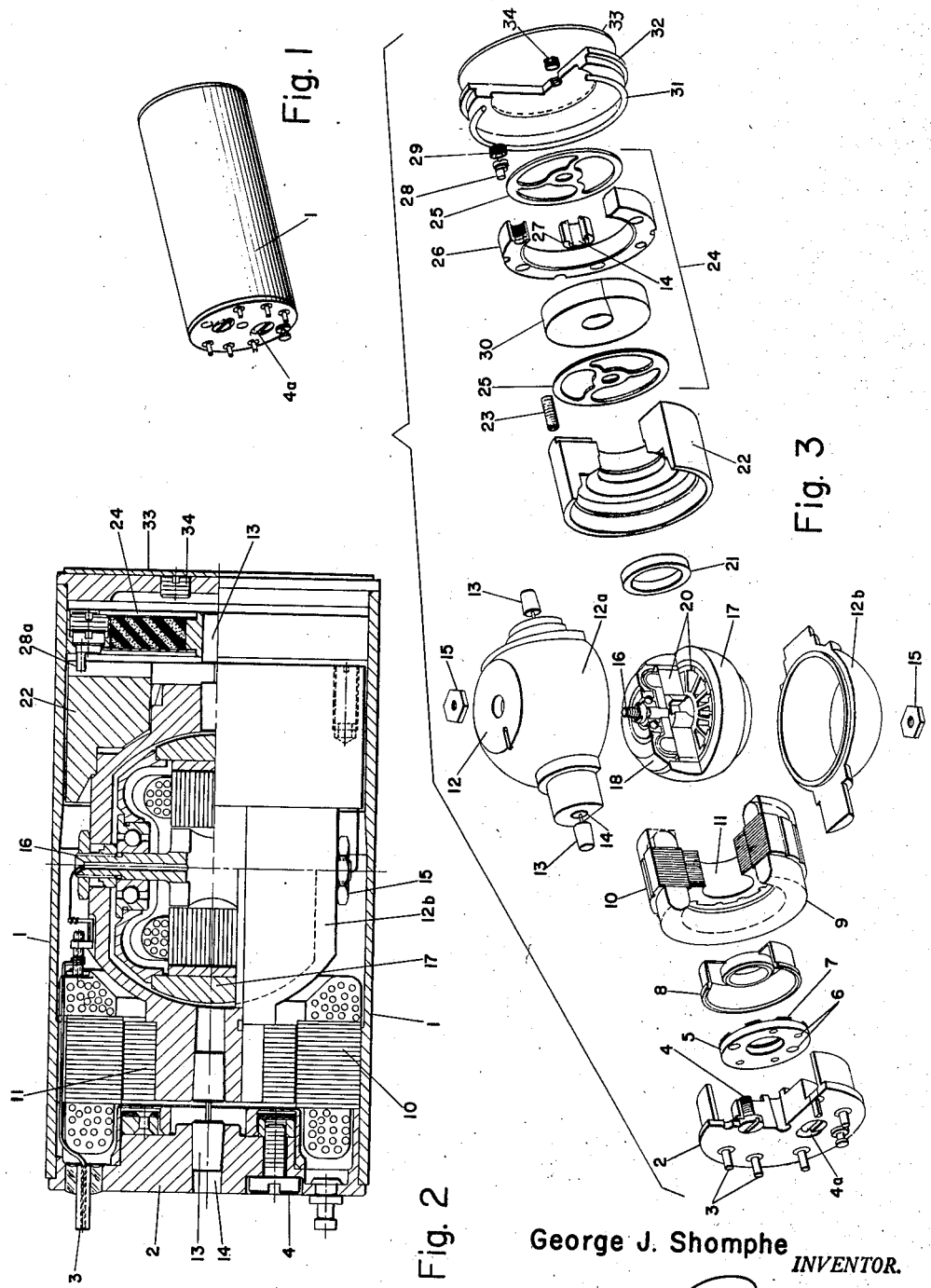
George J. Shomphe
INVENTOR.
BY United States Patent Office 2,805,577
Patented Sept. 10, 1957

2,805,577
GYROSCOPE

George J. Shomphe, Nashua, N. H., assignor to Sanders Associates, Incorporated, Nashua, N. H.

Application November 19, 1953, Serial No. 393,059

5 Claims. (Cl. 74—5)

This invention relates generally to gyroscopes, and more particularly rate gyros, of the type employed in modern aircraft, guided missiles and the like. It is particularly directed to the provision of a rate gyro with means which will permit optimum operation under varying temperature conditions.

It is, therefore, an object of the present invention to provide a gyro having improved means for compensating for the expansion and relative movement of its parts with temperature changes.

Other and further objects will become apparent as the following description proceeds.

In accordance with the invention there is provided a gyroscope comprising a gimbal, a rotor having an axis of spin and supported within the gimbal and a housing for the gimbal. Means within the housing support the gimbal at its opposite ends and permit its rotation about the second axis perpendicular to the axis of spin. These means include an annular spring member having curved elastic arms providing the gimbal with rigid support transversely of the second axis while permitting free, limited, longitudinal movement with respect to the second axis at one of the ends.

In the gyro hereinafter described all moving bearings are eliminated from the gyro gimbal suspension. The support and the centering of the gimbal are accomplished by means of improved supporting elements or torsion bars which embody an invention described in a copending application. These bars not only provide the required supporting means, but also a restraining torque which resists the motion of the gimbal about the output axis. Friction is essentially eliminated from the output shaft suspension.

In accordance with the present invention a spring arrangement is provided at one end of the gyro gimbal, which leaves the gimbal relatively free to move a limited amount longitudinally with respect to its axis while it remains rigidly constrained against transverse forces. Among other advantages, this prevents relatively different amounts of expansion of the gyro parts from placing special strain on the torsion bars. The spring arrangement includes a pair of S-spring members which are spaced longitudinally with respect to the axis of the gimbal and permit the limited amount of longitudinal movement while affording an extremely rigid restraint against transverse movement.

By virtue of the various features of invention employed in the construction herein described there has been achieved a subminiature gyro, less than one inch in diameter, less than two inches long and weighing only 2.9 ounces. This constitutes the smallest gyro now known to exist and meets or exceeds the performance charateristics of larger rate gyros, yet is capable of lower cost production than other larger available instruments.

For a more detailed description of the present invention, reference may now be made to the following description taken in connection with the accompanying drawing.

In the drawing, Fig. 1 is a perspective side view of a gyroscope embodying the present invention shown in actual size; Fig. 2 is an enlarged, side elevation view, partly in section, of the gyroscope of the present invention; and Fig. 3 is an exploded perspective view, partly in section, of the gyro shown in Figs. 1 and 2.

Referring now more particularly to the drawing, the gyro embodying the present invention is shown comprising a housing 1 of generally cylindrical form having attached at one end a cap 2 which may be mounted directly on a stabilized antenna platform even though it is of an extremely small size. This is not possible with any other rate gyro.

Provided in the end cap 2 are leads 3 and null adjusting screws 4. The screws are inserted in their respective holes in the ring 5 through the elongated holes 4a in the end cap, which permit a limited amount of lateral movement of the screws. Null adjusting ring 5 is provided adjacent to the end cap 2 with the screws and rivet holes 6 and pick-off adjustment elements or laminations 7, as shown. A sealing ring 8 is provided at the opposite side of ring 5 with its outer edge surrounding the ring 5 and extending into the cap 2, followed by the pick-off windings 9 in which there is disposed a pick-off stator 10 and rotor comprising transformer laminations 11, as shown.

The gimbal 12 is disposed, in the central portion of housing 1, as shown in Fig. 2, and comprises the split upper and lower sections 12a and 12b which are shown in detail in Fig. 3.

Torsion bars 13 are disposed at opposite ends of the gimbal. They each comprise a narrow central portion which provides the spring restraint and enlarged end portions which are formed integrally therewith and effect rigid and strong supports. The end portions of the bars are tapered and the supports on the gimbal, the end cap 2, and the hub or mount 27 of the S-spring assembly, presently to be described, are correspondingly tapered. They provide the rigid support while permitting rotative movement of the gimbal about the output axis, caused by the angular velocity of the rotor. The torsion bars also afford a restraining torque which resists their angular movement about the output axis and returns the gimbal and rotor to their normal relative angular positions immediately after the input force to the gyro has been removed. Friction is thus essentially eliminated from the output axis of the gyro.

The nuts 15 at the top and bottom of the gimbal sections secure the shaft 16 of the rotor 17. Suitable bearing retainers and bearings are disposed at each end of the rotor shaft providing a symmetrical, balanced, non-cantilever type of support. Caps 18 are provided for the rotor at each end thereof. The two sections of the gimbal are retained by ring 21 and pick-off rotor 11. An annular temperature compensator member 22 hereinafter further referred to in which several balance screws may be secured, one being shown in Fig. 3, is disposed at this end of the housing.

The present invention is directed to an arrangement for preventing special strain on the operating parts of the gyro, particularly the torsion bars, which are occasioned for different rates of expansion of the parts within the gyro, with temperature changes. For this purpose there is provided an S-spring assembly 24 at one end of the housing. This assembly comprises a pair of S springs 25 disposed on opposite sides of a ring member 26, as shown. A hub element 27 which has the torsion bar tapered mounting 14, previously mentioned, and output axis stop pin 28 with lock 29 are provided, these parts being shown separately in Fig. 3 and assembled in Fig. 2. The pin 28 extends into a slot 28a in the annular member 22 which is fixed and rotates with the gimbal. The slot 28a is of a predetermined width and the pin 28 thus limits the amount of angular movement which is allowed the ring 22 and gimbal 12. Within the ring 26 an annular pressure compensator member 30 is disposed. This member is of a cellular material such as a special foam rubber, the cells of which contain a gas or air. An O-ring or gasket 31, a housing-cap 32, and name plate 33 are secured, in the order named, at the S-spring end of the housing. The housing is filled with a suitable damping fluid, such as oil, through a plug 34 in plate 33.

The S-spring assembly permits the rotor and the torsion bars at this end of the housing to be relatively free for longitudinal movement, while remaining rigidly fixed for transverse forces. Among its other advantages, this arrangement, as above pointed out, compensates for special strains on the torsion bars and other parts caused by the different rates of expansion of such parts relative to housing. By providing two S-spring members, spaced with respect to each other longitudinally of the axis of the gimbal supports, it will be apparent that there is provided an extremely rigid and strong support against any movement transverse to this axis while permitted the limited axial movement.

A feature of the invention of a copending application which cooperates with the functions of the S-spring assembly, is the provision for pressure compensation within the housing of the gyro. As stated above the housing or case is filled with a suitable damping fluid or oil and temperature cycling causes different rates of expansion between the fluid and the housing. The differences in expansion are compensated for by the provision of the annular member 30, within the S-spring assembly. This member 30, as stated above, is constructed of a cellular material containing a gas or air which is compressible and thus compensates for relative changes in volume occasioned by the differences between the expansion of the fluid and the housing. Without such compensation, leakage or failure of the gyro would result.

In order to maintain the stability of the gyro, the fluid in the housing provides a damping of the movement of the gimbal about the output axis. Also, the gimbal being immersed in the fluid is given a partially buoyant support which has the effect of reducing its sensitivity to linear acceleration and shock.

The damping member 22 is constructed of a suitable material, such as nylon, which expands with increasing temperature, reducing the gap between it and the housing. It thus increases the shearing damping action of the fluid so as to compensate for its reduction due to the loss of viscosity of the fluid with temperature increases. A low viscosity variation of the damping fluid with temperature over a wide range and the above-mentioned compensations permit operation of the gyro with a minimum of damping variations down to extremely low temperatures, without requiring the use of external heaters to stabilize the damping fluid temperature. The damping fluid employed for the present gyro has this low viscosity variation with temperature characteristic.

It will be seen that the pick-off here provided is basically a differential transformer. The mutual inductance between the primary and secondary of this transformer is varied with the relative angular position of the core laminations. This is in turn effected by the rotation of the output shaft. Thus, this movement is translated into an electrical signal which is proportional and phase sensitive, that is directly responsive, to input angular velocity.

While there has been shown and described a particular embodiment of the present invention, it will be apparent to those skilled in the art that various changes and modifications may be made without departing from the spirit of the invention, and it is therefor intended in the appended claims to cover all such changes and modifications as fall fairly within the spirit and scope of this invention.

What is claimed is:

1. A gyroscope comprising a gimbal; a rotor having an axis of spin and supported within said gimbal; a housing for said gimbal; and means within said housing supporting said gimbal at its opposite ends and permitting its rotation about a second axis perpendicular to said axis of spin, including an annular spring member having curved elastic arms providing said gimbal with rigid support transversely of said second axis while permitting free limited longitudinal movement with respect to said second axis at one of said ends.

2. A gyroscope comprising a gimbal; a rotor having an axis of spin and supported within said gimbal; a housing for said gimbal; and supporting means within said housing supporting said gimbal at its opposite ends and permitting its rotation about a second axis perpendicular to said axis of spin and including an annular spring member having extensible curved arms providing said gimbal with free limited longitudinal movement against tension with respect to said second axis at one of said ends.

3. A gyroscope comprising a gimbal; a rotor supported within said gimbal with an axis of spin; a housing for said gimbal; an S-spring assembly within said housing having a plurality of extensible curved arms for exerting spring tension with respect to gimbal supporting means; and gimbal supporting means within said housing, supporting said gimbal at its opposite ends permitting its rotation about a second axis perpendicular to said axis of spin with free limited longitudinal movement against said spring tension.

4. A gyroscope comprising a gimbal; a rotor supported within said gimbal with an axis of spin; a housing for said gimbal; means within said housing, supporting said gimbal at its opposite ends to permit its rotation about a second axis perpendicular to said axis of spin and including an S-spring assembly comprising spring members having a plurality of extensible curved arms extending from its central portion providing relatively substantial rigidity for said gimbal transversely and relatively great elasticity for said supporting means longitudinally, for permitting limited longitudinal movement of the gimbal against spring tension with respect to said axis, at one of said ends.

5. A gyroscope comprising a gimbal; a rotor supported within said gimbal with an axis of spin; a housing for said gimbal; means within said housing, supporting said gimbal at its opposite ends to permit its rotation about a second axis perpendicular to said axis of spin and including an S-spring assembly comprising a pair of spring members each having a plurality of extensible curved arms extending from its central portion providing relatively substantial rigidity for said gimbal transversely and relatively great elasticity for said supporting means longitudinally, for permitting limited longitudinal movement of the gimbal against spring tension with respect to said axis, at one of said ends.

References Cited in the file of this patent

UNITED STATES PATENTS

| | | |
|---|---|---|
| 2,322,108 | Best | June 15, 1943 |
| 2,484,823 | Hammond | Oct. 18, 1949 |
| 2,672,054 | Warren et al. | Mar. 16, 1954 |